United States Patent [19]

Bales et al.

[11] Patent Number: 5,373,549

[45] Date of Patent: Dec. 13, 1994

[54] MULTI-LEVEL CONFERENCE MANAGEMENT AND NOTIFICATION

[75] Inventors: Bruce M. Bales, Louisville; Robert L. Crumpley, Westminster; Donald D. Gallagher; Stephen M. Thieler, both of Boulder, all of Colo.

[73] Assignee: AT&T Corp., Murray Hill, N.J.

[21] Appl. No.: 996,348

[22] Filed: Dec. 23, 1992

[51] Int. Cl.⁵ .................... H04M 3/56; H04M 11/06
[52] U.S. Cl. ........................................ 379/93; 379/96;
 379/204; 379/202; 379/201; 370/62
[58] Field of Search ............... 379/202, 204, 205, 206, 379/207, 157, 158, 93, 96; 370/62

[56] References Cited

U.S. PATENT DOCUMENTS

| | | | |
|---|---|---|---|
| 4,359,603 | 11/1982 | Heaton | 370/62 |
| 4,436,963 | 3/1984 | Cottrell et al. | 379/211 |
| 4,546,468 | 10/1985 | Christmas et al. | 370/54 |
| 4,796,293 | 1/1989 | Blinken et al. | 379/202 |
| 5,212,726 | 5/1993 | Dayner et al. | 379/202 |

*Primary Examiner*—Thomas W. Brown
*Assistant Examiner*—Daniel Hunter
*Attorney, Agent, or Firm*—John C. Moran

[57] ABSTRACT

A multi-level conference in which an originator of a telephone conference of the multi-level conference controls the parties that can be added to that conference and can terminate any party at any time. Further, if two existing telephone conferences are combined together to form the multi-level conference, the party that originated the combining of these two conference calls can control not only the parties on its conference call but can disconnect all of the parties on the second conference call. In addition, the control of the conference resides in the telephone terminals being utilized by the participants, rather than in a centralized service computer. Information concerning the conference and control of the conference is communicated between the telephone terminals utilizing the standard telecommunication communication control channel and does not require the establishment of a separate data call to a centralized service computer. In addition, the telephone terminals display the names and telephone numbers of parties on the multi-level conference and identifies parties controlling the individual conferences. In addition, when two conferences are combined together, each originator of a conference maintains control over their subconference and can independently separate that subconference from the other conference in a multi-level conference.

14 Claims, 16 Drawing Sheets

FIG. 2 MESSAGE FLOW

FIG. 6 MESSAGE FLOW

FIG. 7 MESSAGE FLOW

MULTI-LEVEL CONFERENCE MANAGEMENT AND NOTIFICATION

TECHNICAL FIELD

This invention relates to controlling a telecommunication switching system, and, in particular, to telephone conference calls on such a switching system.

BACKGROUND OF THE INVENTION

In prior art business communication switching systems (also referred to as PBXs), a conference call can be set up between a plurality of station sets by a station set conferencing other station sets into a conference. Indeed, it is possible to have two conferences set up between two different sets of station sets and to join those two conferences. A station set on the first conference conferences a station set on the second conference into the first conference, which results in all of the station sets of the second conference becoming par of the first conference. The problem that arises is that the two sets of station sets cannot be disengaged from the resulting conference call without each station set hanging up, since no station set has control of the resulting conference. In prior art business communication systems, conference calls result in many awkward and inefficient situations because one station set does not control the conference.

Within the AT&T long distance telephone network, a teleconferencing service known as the Alliance Dedicated Teleconferencing Service is available. An Alliance system comprises a teleconferencing bridge connected to a 4ESS toll switch. The Alliance system can conference up to 56 telephone lines interconnected via the 4ESS toll switch to the teleconferencing bridge. Conference calls are setup and controlled by AT&T operators who can selectively add and drop people to a conference and who can obtain a visual display of the individuals on the conference by name and telephone number.

In an attempt to improve upon the Alliance system, U.S. Pat. No. 4,796,293 discloses interposing a service computer between a coordinator of a conference and the Alliance system. The service computer uses the same interface into the Alliance system as that of an operator terminal inter The service computer gives the coordinator an improved human interface to the Alliance system than that of an AT&T operator terminal. The service computer takes the place of the AT&T attendant. In order to establish communication with the service computer, the coordinator is required to use a separate packet data system to establish communication between the service computer and the coordinator's computer terminal. Once this communication has been established, the coordinator has the same capabilities as the AT&T operator. The service computer assumes that the first terminal to establish communications with the service computer is the coordinator's terminal. Other conferees can interconnect their computer terminals to the service computer via the packet network if each has a login ID and a password. Each conferee who accesses the service computer via their own computer terminal also has displayed for them the names and, telephone numbers of the people on the conference. The coordinator has the capability to sub-conferences. All conferees converse using regular telephones. Once subdivided, the coordinator can also recombine the two sub-conferences.

The problems of the prior art are the lack of control and identification in business communication switching systems and the need in the system disclosed by U.S. Pat. No. 4,796,293 for a separate service computer which requires interconnection via a separate packet network. Further, in the case of U.S. Pat. No. 4,796,293 the conference call must begin on a dedicated conference bridge. What is needed is a unified conferencing system whereby users can, during the course of a two party conversation, convert that two party conversation into a conference call with the originator of the conference call controlling the conference call with respect to adding and dropping individuals. Further, each user has displayed for them the participants in the conference calls on the telephone terminal of the user.

SUMMARY OF THE INVENTION

The foregoing problems are solved, and a technical advance is achieved by a switching system and method, in which the originator of a telephone conference controls the parties that can be added to that conference and can terminate any party at any time. Further, if two existing telephone conferences are joined together, the party that originated the joining of these two conference calls can control not only the parties on its conference call but can disconnect all of the parties on the second conference call. In addition, the control of the conference resides in the telephone terminals being utilized by the participants rather than in a centralized service computer. Information concerning the conference and control of the conference is communicated between the telephone terminals utilizing the standard telecommunication communication control channel and does not require the establishment of a separate data call to a centralized service computer. In addition, the telephone terminals display the names and telephone numbers of parties on a multi-level conference and identify the parties controlling the conferences. In addition, when two conferences are combined together, each originator of a conference maintains control over their subconference and can independently separate that subconference from the other conference in a multi-level conference. Also, the telephone terminal of the originator transmits party identification to the other telephone terminals in its conference.

Advantageously, the telephone terminals communicate utilizing ISDN messages. Advantageously, the standard notify message of the ISDN protocol has been expanded, to carry conference information and allows for the conference information to be communicated in the D channel (control channel) of the ISDN protocol rather than requiring the use of another B channel (voice or data channel) to setup a data call.

DETAILED DESCRIPTION

Figure 1:
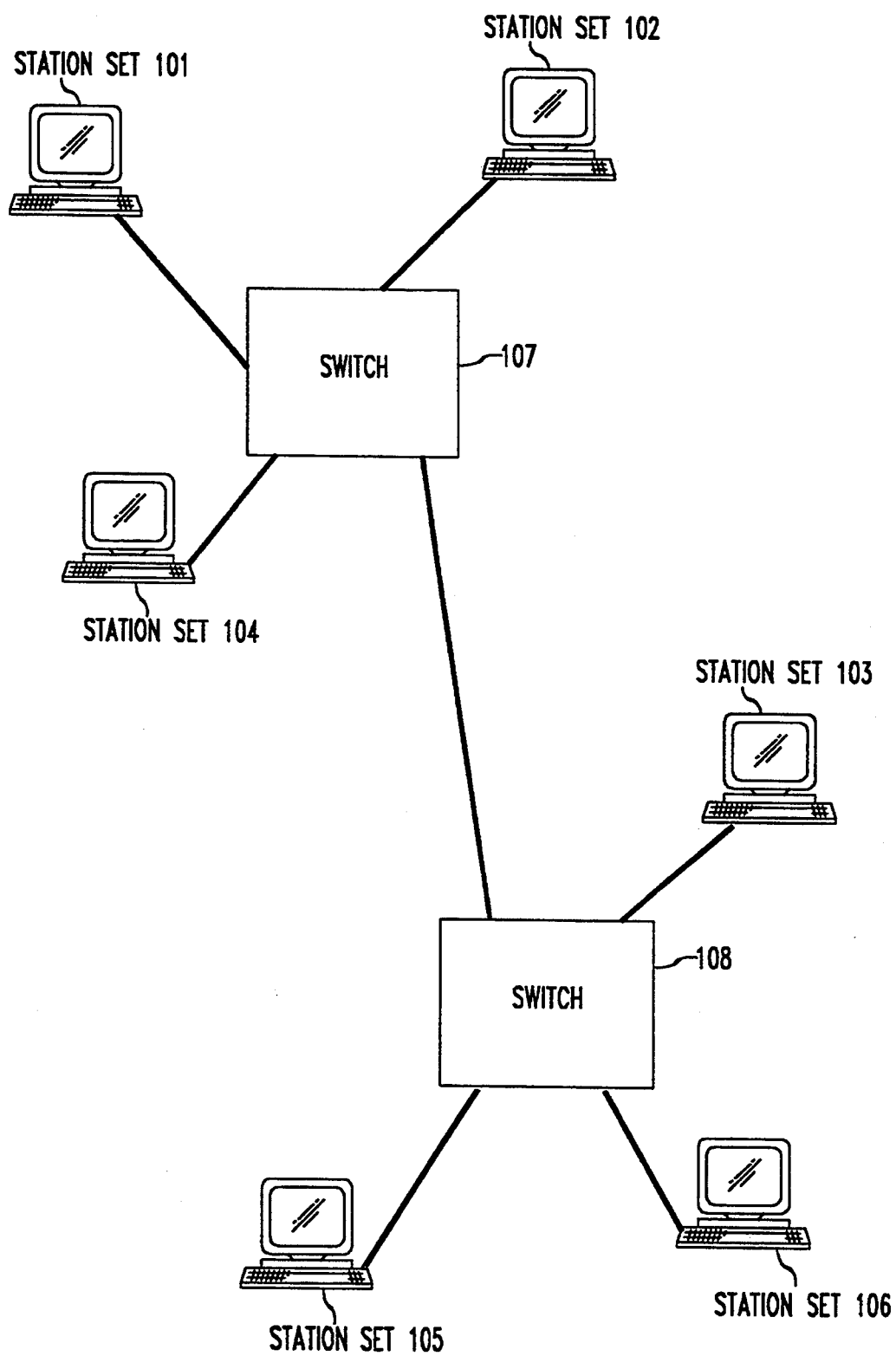
FIG. 1 shows a telecommunication switching system in accordance with the invention.

FIG. 1 illustrates a telecommunication switching system where station sets 101 through 106 are interconnected by switches 107 and 108. The operations of station sets 101 through 106 and switches 107 and 108 are described in further detail in the U.S. patent application entitled "Automatic Initialization of a Distributed Telecommunication System", U.S. patent application Ser. No. 07/816360, filed on Dec. 30, 1991 and having the same assignee as the present patent application. This patent application of Bales is hereby incorporated by reference. Both the station sets and the switches implement a conventional OSI model modified to implement the ISDN protocol. As set forth in the above-incorporated patent application, certain modifications have been made to the standard OSI model in order to include ISDN capabilities. Within the software model, there are eight software layers, each of these software layers is described in detail in the above-incorporated patent application. (Note, that the OSI model is also designated as having seven layers where the highest layer combines layers seven and eight of the description in the present application.) The present application is presented in terms of the highest software layer, applications layer, and assumes the detail set forth in the above-incorporated patent application. In addition, the functions performed by the remaining software layers such as system initialization, call routing, and message transmission is also set forth with respect to the above-incorporated patent application.

The present invention is described by the way of an example where station sets 101, 102, and 103 are placed in a first conference call, and station sets 104, 105, and 106 are placed in a second conference call. Station set 101 controls the first conference call, and station set 104 controls the second conference call. These two conference calls are then joined together to form a multi-level conference call. The first conference call is set up by the message flow illustrated in FIG. 2. Within the message diagrams of FIGS. 2, 6, 7, and 12, the designations A, B, C, D, E, and F, refer to station sets 101, 102, 103, 104, 105, and 106, respectively. Station set 101 first sends a set up message in line 201 to station set 102. The set up message contains the destination which is station set 102, the originator which is station set 101, and includes the alphanumeric name of the user of station set 101. Station set 102 responds in line 202 by transmitting a call proceeding message back to station set 101. Station set 102 then transmits the alerting message back to station set 101 in line 203. The alerting message contains the telephone number (address) and the alphanumeric name of the user of station set 102. After the user of station set 102 has gone off hook, station set 102 transmits back in line 204 a connect message. Switch 107 is responsive to the connect message to set up a voice path between station set 101 and station set 102. Station set 101 is responsive to the connect message from station set 102 to transmit back the connection acknowledgment message in line 205.

Station set 101 originates another call with station set 103 in lines 206 and 207 which perform the equivalent actions as lines 201 and 202 did for the first call. The user of station set 101 invokes the conference call by actuating the conferencing button on station set 101. By transmission of the merge message of line 208, station set 101 requests that switch 107 merge the first and the second call together in response to the user's actions. The merge function is different than a conference function in that switch 107 only combines the B channels (voice portions) associated with the two calls for transmission to each of the three station sets and not the D channels (signaling portions). The signaling from stations sets 102 and 103 is only transmitted to station set 101 which allows station set 101 to retain control of the conference in accordance with the invention. If switch 107 performed a conferencing function, all three stations sets would receive both signaling and voice information which would result in no station set having control of the conference. In response to the merge message, switch 107 performs the merge function and transmits back the merge acknowledgment message in line 209.

Station set 101 then transmits to station set 102 in line 210 a notify message which informs station set 102 that the second party (P=2, with 2 being the ID number) on the conference is station set 103 and that station set 101 is the controlling station set (CP=A). Similarly, station set 101 transmits to station set 103 a notify message in line 211 that informs station set 103 that the first party on the conference is station set 102 and provides the name of the user of station set 102 to station set 103. In line 212, station set 103 transmits back an alerting message indicating that it is now alerting the user and provides its station set number as well as the name of the user of station set 103. Station set 101 is responsive to the alerting message in line 212 to transmit a notify message to inform station set 102 of the second party's name and the fact that the second party is being alerted.

When the user of station set 103 answers the telephone call, station set 103 transmits back the connect message in line 214. Station set 101 is responsive to the connect message to send a notification message in line 216 to station set 102 informing it that the second party is now connected and a connect acknowledge message in line 215 back to station set 103. Switches 107 and 108 are responsive to the connect message from station set 103 to set up voice paths to interconnect the three station sets.

Figure 2:
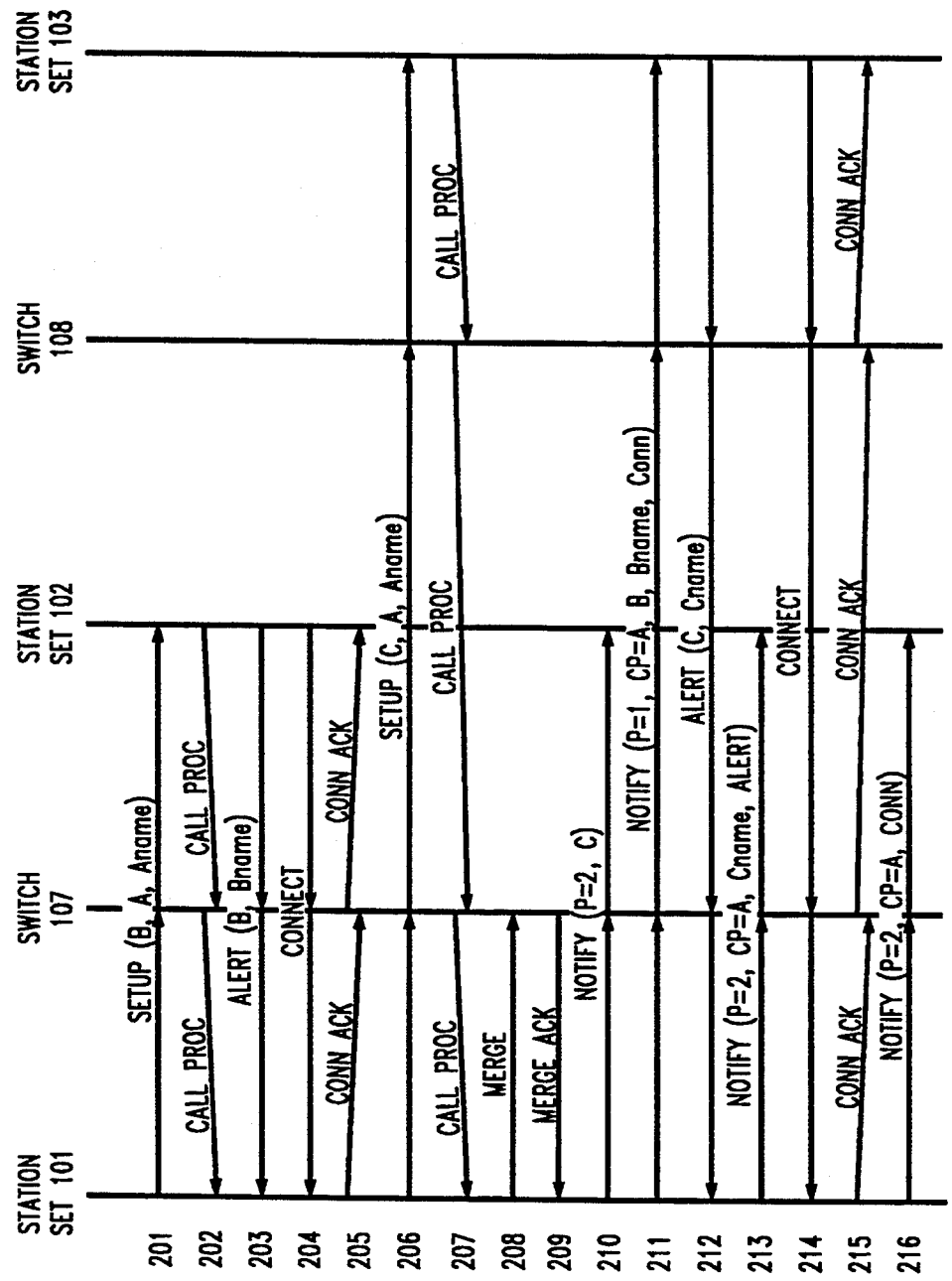
FIG. 2 shows the message flow for a station set to set up a three way conference call.
Figure 3:
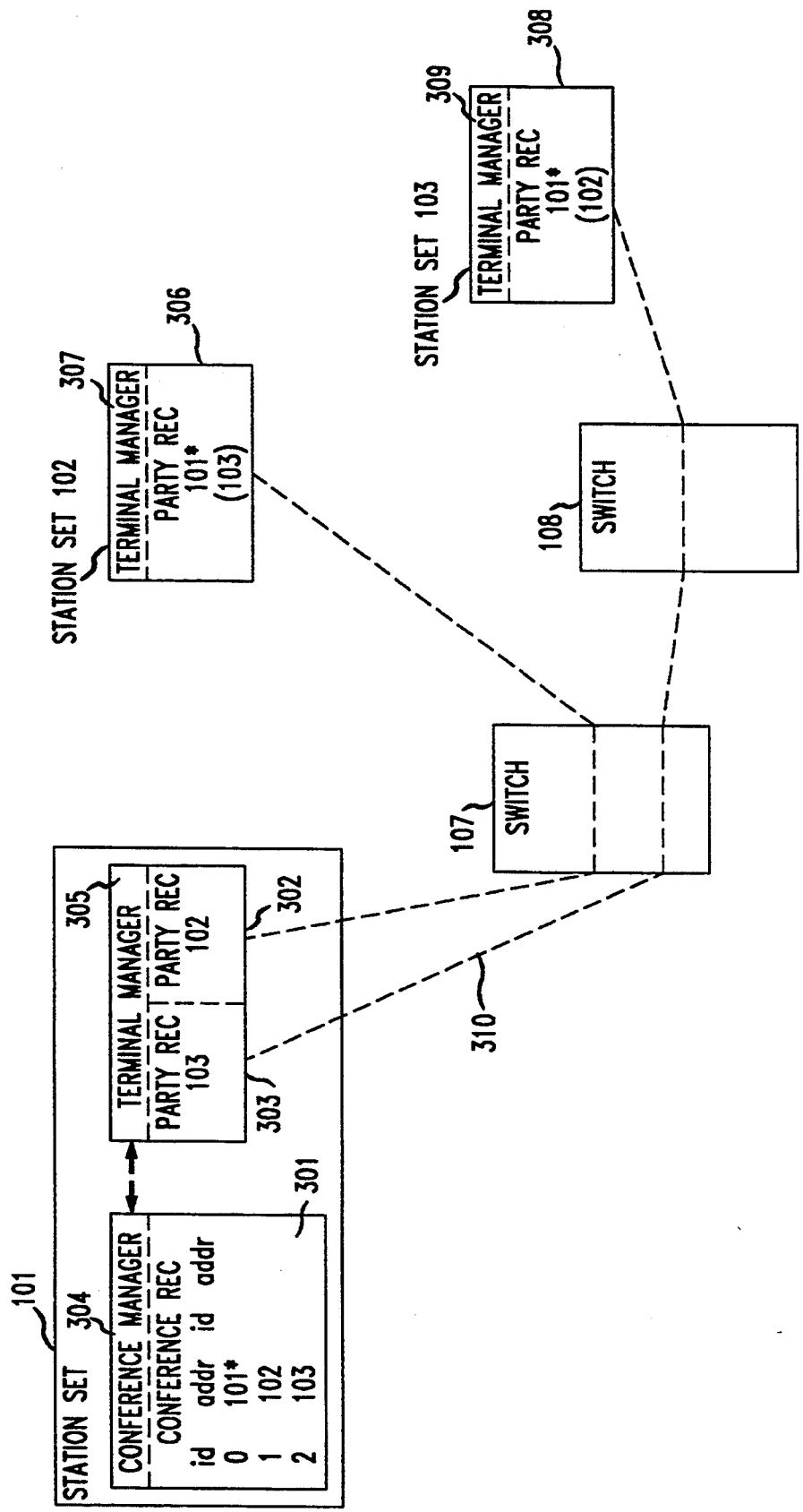
FIG. 3 illustrates the records which are maintained for a three way conference call.

FIG. 3 illustrates the records which have been set up in station sets 101 through 103 and, in switches 107 and 108 in response to the messages of FIG. 2. The records and managers are located at the highest software layer, application layer, of the software structure of the station sets. As is described in greater detail later, the terminal manager invokes the conference manager upon actuation of the conference button on station set 101. Each terminal manager maintains a party record for each half of the call in which the terminal manager is involved. Each party record contains a record of the names of users and addresses (telephone numbers) of the parties on the other half of the call. For example, party records 302 and 303 contain the name and address of the users of station set 102 and station set 103, respectively. The name and address for station set 102 stored in party record 308 is designated by "102". Station sets 102 and 103 reflect in their party records (306 and 308) the station set that is the controlling station set and the sub-party station set. In party record 306, the name and address, 101, for station set 101 has an asterisk after it denoting that this is the controlling party and the name and address, 103, for station set 103 is enclosed in parenthesis indicating that it is a sub-party in the conference.

FIG. 3 only illustrates the logical message channels (such as logical channel 310) that are established between the station sets via switches. These logical channels allow the communication of messages between terminal managers. The manner in which these logical channels are established is set forth in the above-incorporated patent application. In addition, the switches are responsive to connect messages to establish voice channels between station sets. The manner in which voice channels are established and terminate is also set forth in the above-incorporated patent application.

Within station set 101, conference manager 304 maintains conference record 301 which maintains the ID numbers utilized to identify the different users on the conference call as well as the station set associated with that user. Terminal manager 305 is responsive to messages related to a conference to relay those messages to conference manager 304. These identification numbers were included in the notify messages of FIG. 2. In addition, conference manager 304 can directly access party records 302 and 303; and terminal manager 305 can directly access conference record 301. In party record 306 of station set 102, station set 101 (entry 101*) is designated as controlling the conference and station set 103 (entry 103) is designated as being a sub-party.

Station set 102 builds party record 306 in response to the set-up message in line 201 of FIG. 2. Since station set 102 receives the set-up message from station set 101, station set 102 assumes that station set 101 is the master station set if a subsequent conference call is set up. The entry of "(103)" into party record 306 occurs when station set 102 receives the notification messages illustrated in lines 210 and 213 of FIG. 2. These two notification messages inform station set 102 that station set 103 is the second party on the conference call and gives the name and address for station set 103. Party record 308 in station set 103 is built in a similar manner as party record 306.

Figure 4:
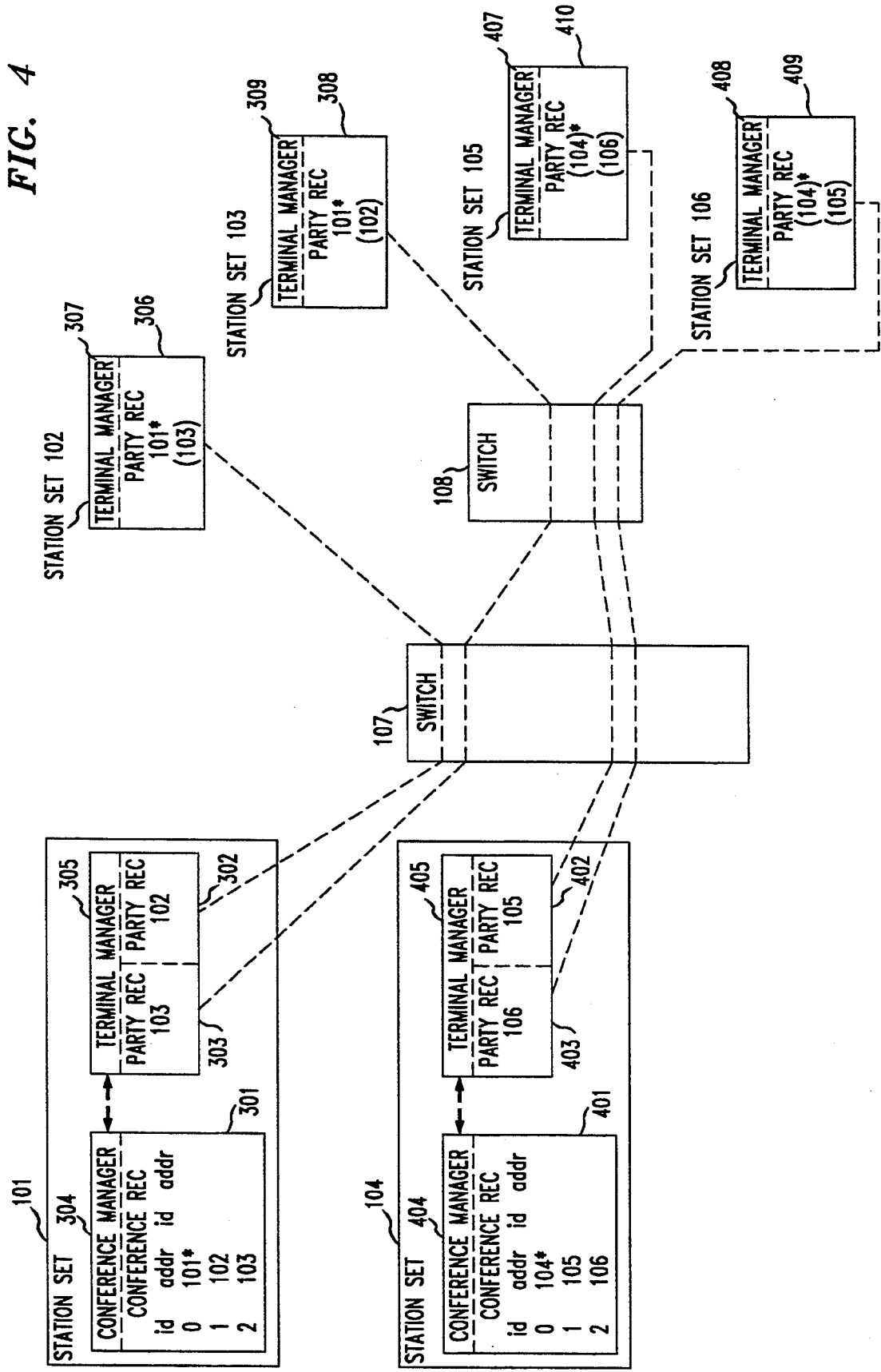
FIG. 4 illustrates the records which are set up for two independent conferences.

FIG. 4 shows the configuration of party records and conference records after the second conference is established between station sets 104 through 106. Party records 402 through 410 are utilized in setting up this second conference. Conference record 401 which is maintained by conference manager 404 stores information with respect to the second conference just as conference record 301 in station set 101 stores the information with respect to the first conference.

Figure 5:
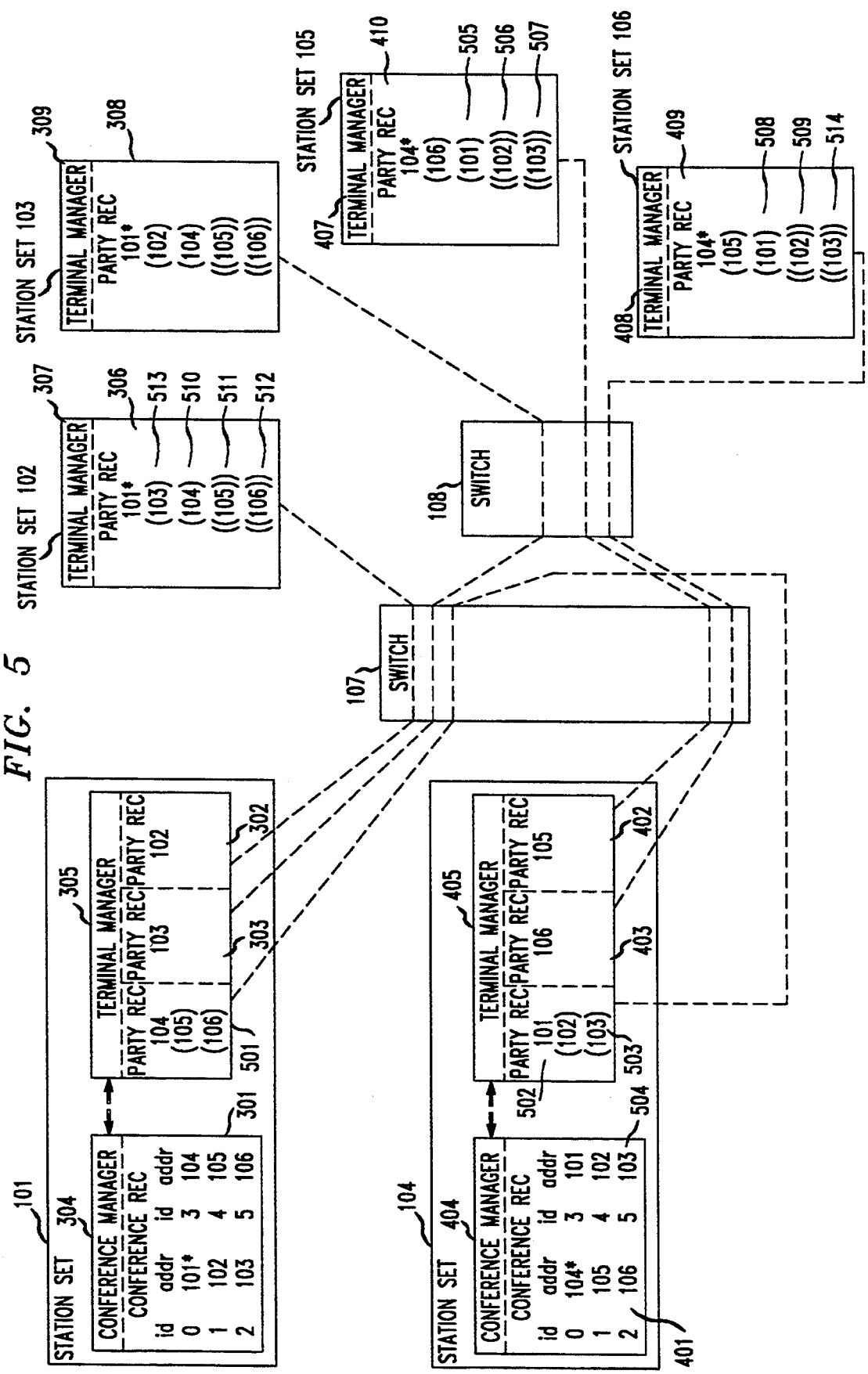
FIG. 5 illustrates the records which are utilized when two existing conferences are joined together into a single conference.
Figure 6:
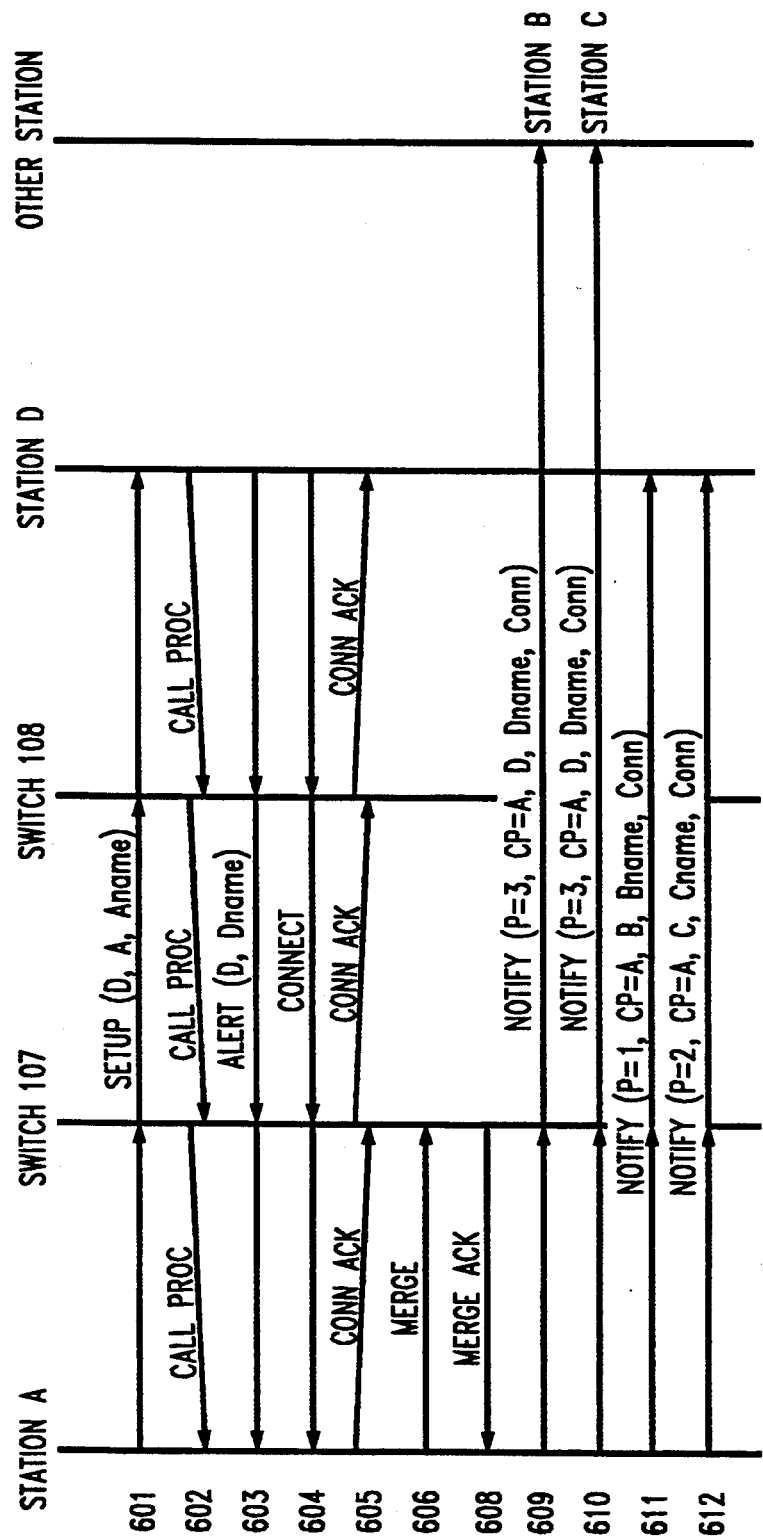
FIG. 6 illustrates the message flow when the originator of a second conference call is added to a first conference call.

FIG. 5 illustrates the combining of the two conference calls into a multi-level conference call by station set 101 adding station set 104 into the first conference call and then by station set 104 setting up the multi-level conference call by merging the first and second conference calls. FIG. 6 illustrates the messages for adding station set 104 into the first conference call. Lines 601 through 605 illustrate the setting up of a call path between station set 101 and station set 104. Lines 606 and 608 show that station set 104 is merged into the first conference. However, station sets 105 and 106 are not merged at this point in time since they are connected to station set 104 via a different call path. In lines 606 and 608, station set 101 causes switch 107 to merge station set 104 into the first conference call. In line 609, station set 101 transmits a notify message to station set 102 informing it that station set 104 has been added to the first conference call, as party 3, that station set 101 is the controlling party, and that the name of the user of station set 104 is included. Further, line 609 indicates that station set 104 is now connected.

In response to the notify message of line 609, station set 101 adds station set 104 as a sub-party to the multi-level conference call as illustrated in line 510 of party record 306 of FIG. 5. At this point in time, lines 511 and 512 for station sets 105 and 106 have not been placed in party record 306. Line 610 accomplishes similar operations in party record 308 of station set 103. Lines 611 and 612 of FIG. 6 are notify messages to station set 104 that define station sets 102 and 103 and allow station set 104 to build party record 502 of FIG. 5.

Information about station set 101 is added to conference record 401 of FIG. 5 in response to the receipt of the messages in lines 601 through 605 as illustrated on FIG. 6. Station sets 102 and 103 are added to conference record 401 in response to the notify messages transmitted from station set 101 to station set 104 in lines 611 and 612 of FIG. 6. Station set 104 considers station set 101 as party 3, station set 102 as party 4, and station set 103 as party 5. The terminal manager in station set 104 correlates these ID numbers with the ID numbers used by station set 101 in conference record 301 by utilizing the information in party record 502 which shows that station sets 102 and 103 are sub-parties to station set 101. From party record 502, the conference manager in station set 104 can determine that station set 102 has an ID of 1 in the conference controlled by station set 101.

Figure 7:
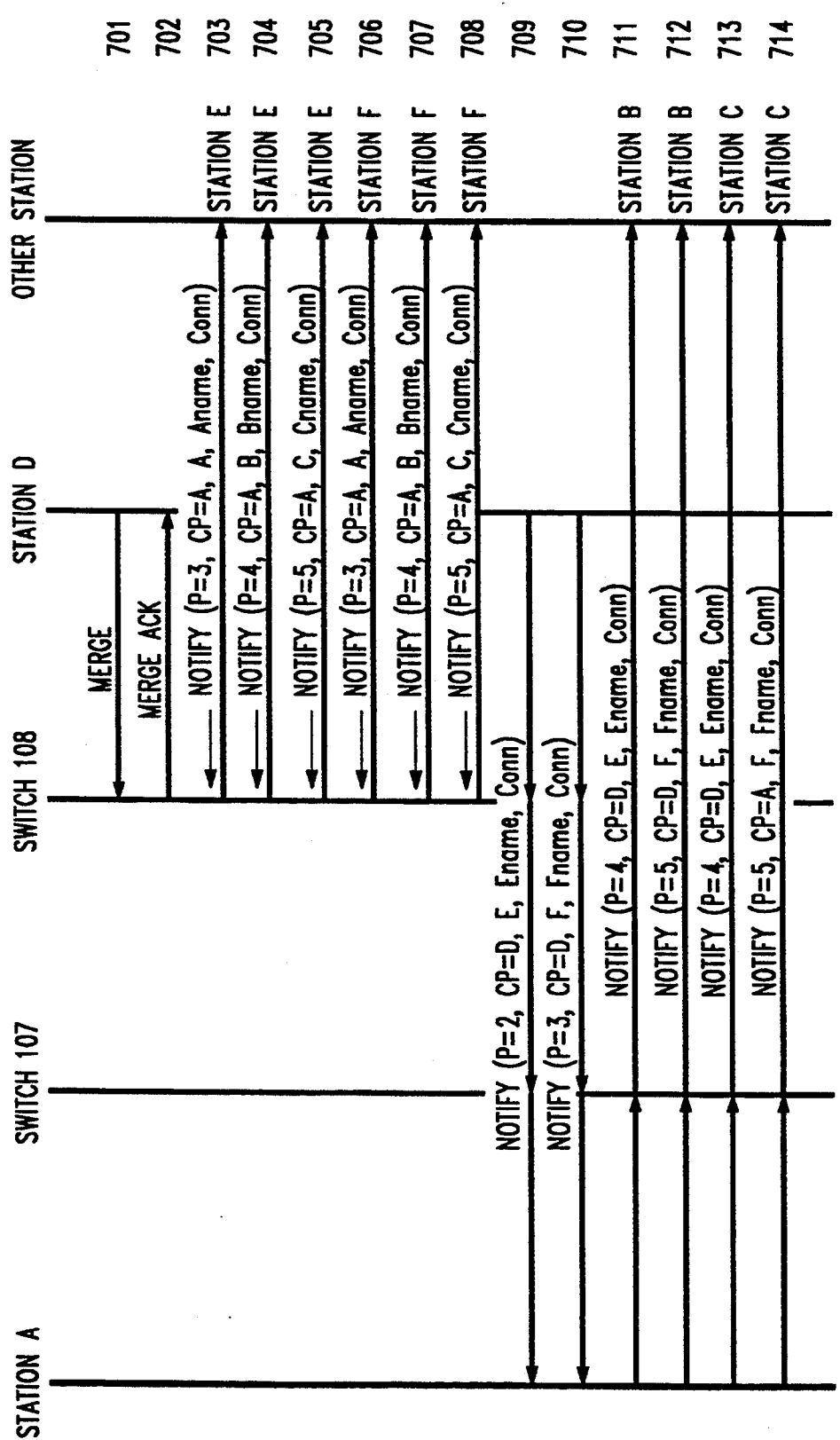
FIG. 7 shows the messages which are transmitted by the originating station of the second conference call to update the various stations on the second conference call.

FIG. 7 gives the message flow which allows station sets 105 and 106 to be placed into the multi-level conference call with station sets 101 through 104. First, station set 104 transmits a merge message to switch 108 as illustrated in line 701 of FIG. 7. This causes switch 108 to join the conference call that is established between station sets 104 through 106 into the multi-level conference call which is established between station sets 101 through 104. Switch 108 responds back to station set 104 with the acknowledge message in line 702.

Party record 410 in station set 105 is expanded by entries 505 through 507 to reflect the multi-level conference call by transmission of notify messages from station set 104 to station set 105 as given in lines 703 through 705 of FIG. 7. These messages add the entries 505 through station sets 101, 102, and 103, respectively, to party record 410. In party record 410, station set 105 reflects the fact that station sets 102 and 103 are sub-parties to station set 101. The notify messages of lines 707 through 708 are utilized by station set 106 to enter the information with respect to station sets 101 through 103 into party record 409.

Station set 104 utilizes notify messages 709 and 710 to transmit to station set 101 information that station sets 105 and 106 are sub-parties to station set 104 (since CP=D) in a conference call. Station set 101 utilizes this information to complete party record 501 and conference record 301. Note, that all of the notify messages transmitted in FIG. 7 also contain the name of the user of each station set. Station set 101 is responsive to the notify messages of lines 709 and 710 to complete the entries into party record 501 and conference record 301 and also to transmit this information to station sets 102 and 103 using notify messages given in lines 711 through 714 of FIG. 7. Station sets 102 and 103 utilize the information from the messages of lines 711 through 714 to complete party records 306 and 308 of FIG. 5. For example, station set 102 is responsive to the notify messages of lines 711 and 712 to make entries 511 and 512 into party record 306.

Figure 8:
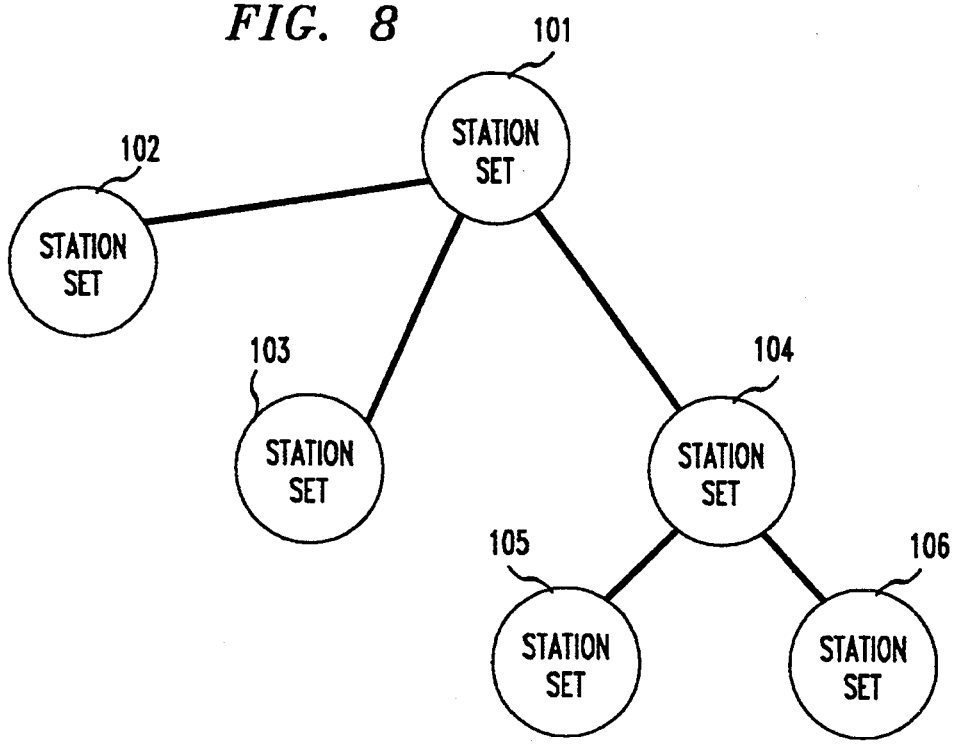
FIG. 8 reflects view of the conference manager of station set 101 of the multi-level conference as illustrated in FIG. 5.
Figure 9:
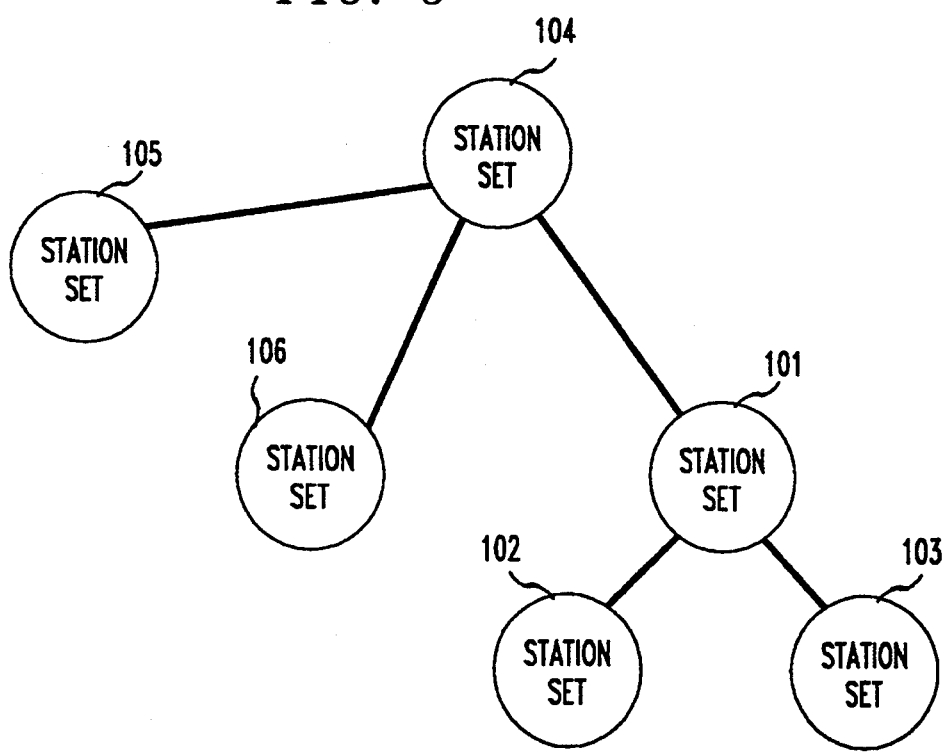
FIG. 9 illustrates the view of the conference manager in station set 104 of the multi-level conference call illustrated in FIG. 5.

FIG. 8 reflects the view of station set 101 to the multi-level conference call that has been established in FIG. 5 on the basis of party record 501 and conference record 301. Similarly, FIG. 9 reflects view of station set 104 to the multi-level conference call on the basis of party record 502 and conference record 401. As can be seen from FIGS. 8 and 9, both station sets 101 and 104 consider themselves in control of the multi-level conference call. However, station set 101 cannot individually disconnect station sets 105 or 106 from the conference; but station set 101 can disconnect station set 104 from the conference which results in station sets 105 and 106 also being disconnected. Similarly, station set 104 can only disconnect station set 101.

Figure 10:
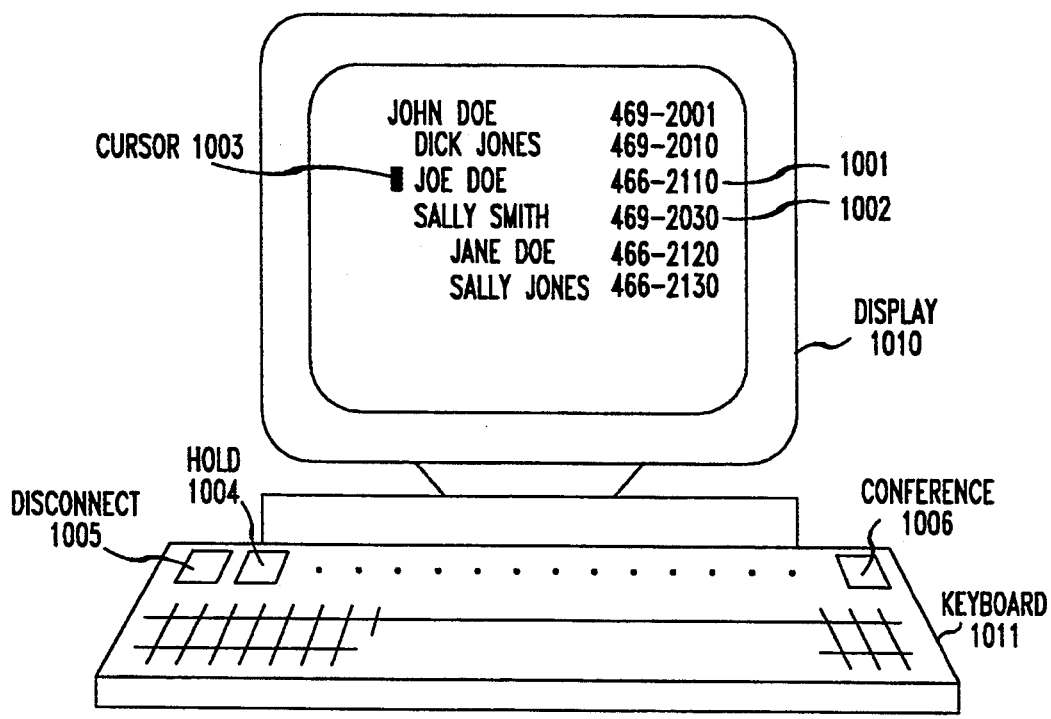
FIG. 10 illustrates the display provided by station set 101 for the multi-level conference call illustrated in FIG. 5.
Figure 11:
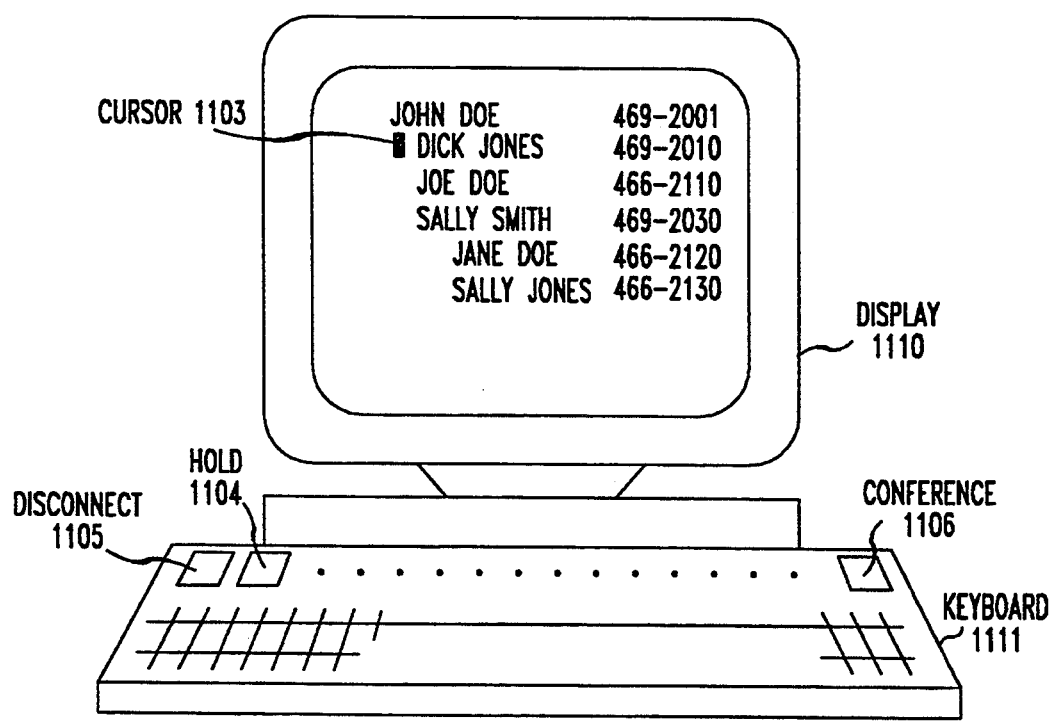
FIG. 11 illustrates the screen of station set 102 for the multi-layer conference call illustrated in FIG. 5.

A terminal manager in a station set is responsive to the information in a party record to display that information to the parties on a display screen of the terminal manager's station set. FIG. 10 illustrates the display screen of station set 101 which reflects the information stored in the party records for station set 101 as defined in FIG. 5. Similarly, FIG. 11 shows the screen of station set 102 for FIG. 5. The displays shown on FIGS. 10 and 11 are but one of many ways that the information contained in the party records of these two station sets could be displayed. In addition, as station set information changes the party record, the terminal manager displays that information on the screen of the station set. This allows the user of a station set to have constant information of how the conference is developing. In addition, the user can control a conference call with the display and associated keys.

In accordance with the invention, in a multi-level conference, the station controlling an individual conference can terminate any station set on that conference and can terminate the connection to the multi-level conference. A station set which is a sub-party to a conference can only terminate itself from the conference and is incapable of terminating another station set. Similarly, in a multi-level conference, a station set that is controlling one conference cannot terminate station sets which are sub-parties on another conference. To illustrate this, consider the following examples. In the first example, station set 101 terminates station set 103 from the multi-level conference call; and in the second example, station set 104 terminates the multi-level conference call. In the first example, the user of station set 101 actuates the disconnect of station set 103 by positioning cursor 1003 on the display of station set 101 as illustrated in FIG. 10 next to entry 1001 for station set 103 and actuating disconnect 1005 button. To terminate/disconnect station set 103, station set 101 transmits a disconnect message to switch 107 as illustrated in line 1201 of FIG. 12. Switch 107 is responsive to the disconnect message to terminate the link between station set 101 and switch 107 which was supporting the call connection to station set 103. In addition, switch 107 transmits a disconnect message to station set 103 and terminates the link that was used to support the call with station set 103. Terminal manager 309 in station set 103 is responsive to the disconnect message to remove party record 308.

Figure 12:
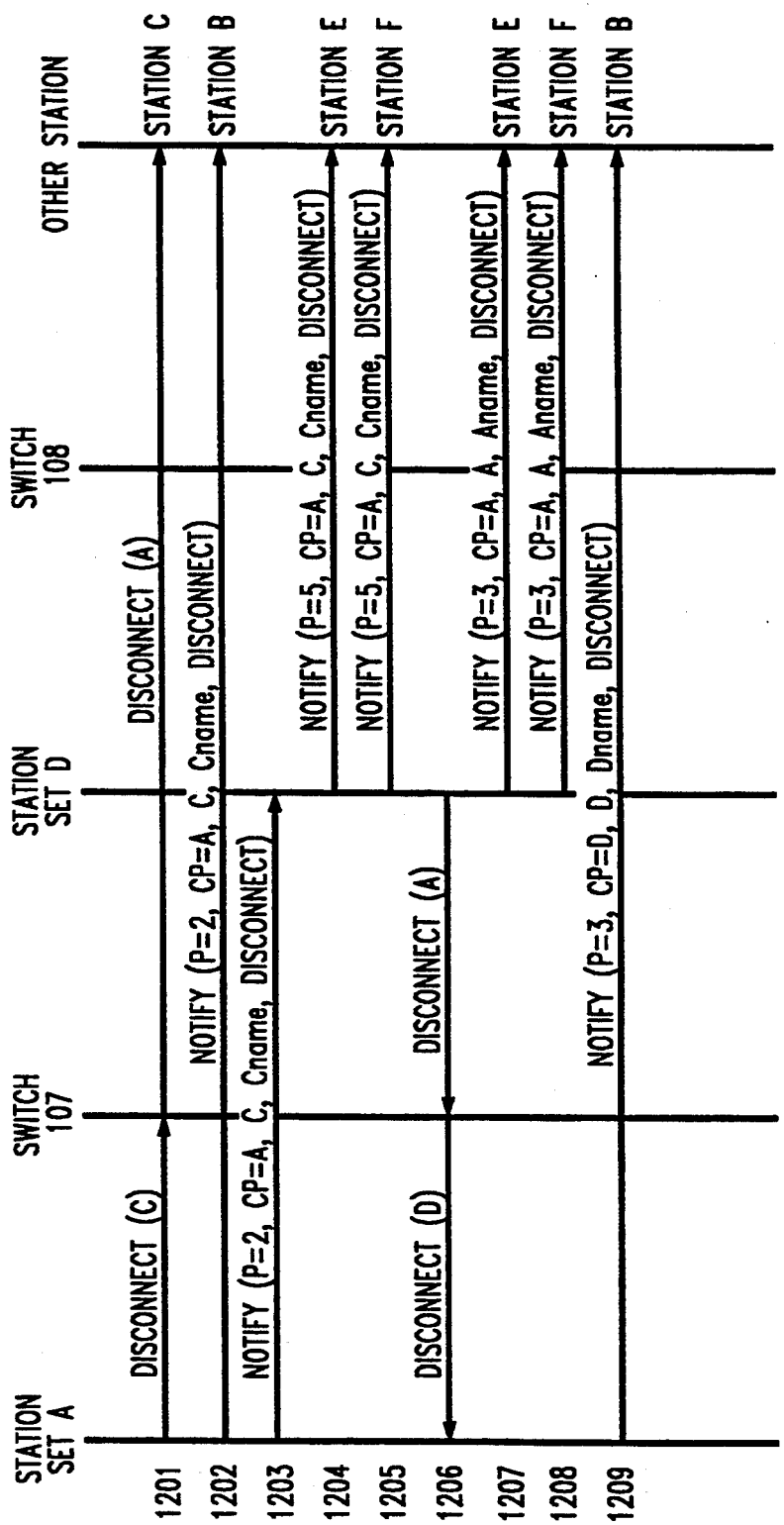
FIG. 12 illustrates message flow to terminate a multi-level conference call.

Next, station set 101 transmits a notify message as illustrated in line 1202 of FIG. 12 to station set 102 to notify station set 102 that station set 103 is no longer part of the first conference call. Station set 102 is responsive to the notify message of line 1202 to remove entry 513 from party record 306 as illustrated in FIG. 5.

In addition, station set 101 transmits the notify message of line 1203 to station set 104. Terminal manager 405 of station set 104 is responsive to the notify message to remove entry 503 from party record 502. Conference manager 404 is responsive to this notify message relayed from terminal manager 405 to remove entry 504 from conference record 401. Further, terminal manager 405 of station set 104 transmits the notify messages illustrated in lines 1204 and 1205 to station sets 105 and 106, respectively. Terminal manager 407 of station set 105 is responsive to the notify message of line 1204 to remove entry 507 from party record 410 as illustrated FIG. 5. Similarly, terminal manager 408 of station set 106 removes the reference to station set 103 from party record 409 by removing entry 514.

Figure 13:
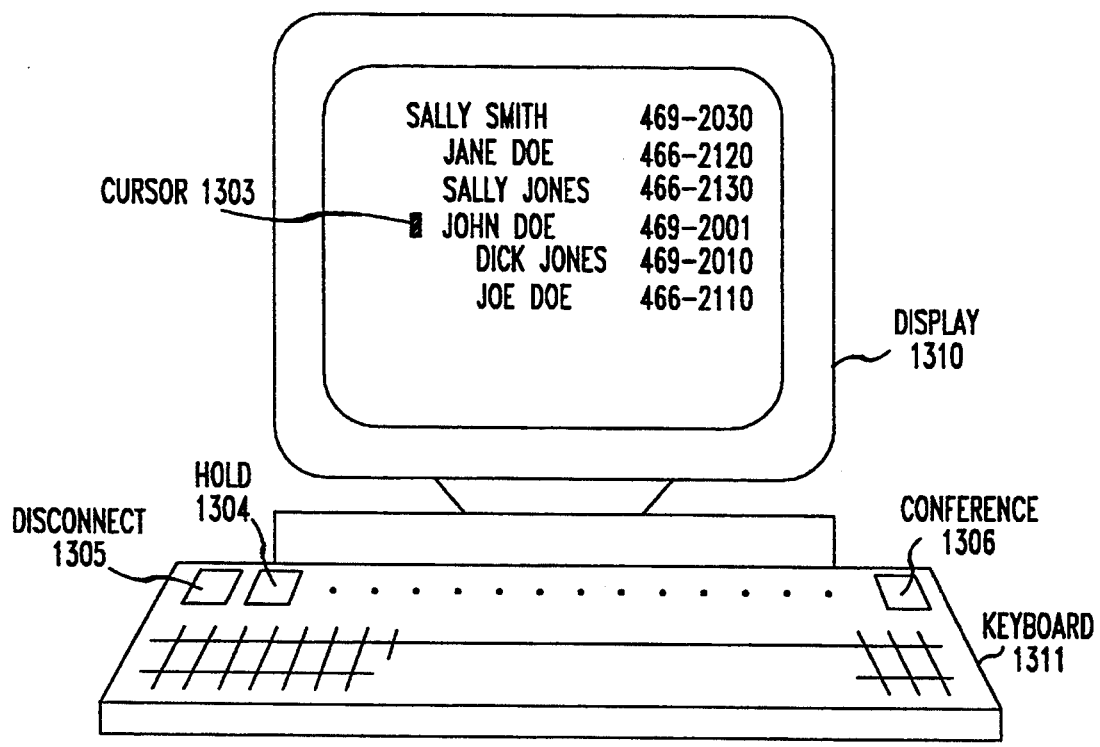
FIG. 13 illustrates the display provided by station set 104 for a multi-level conference call.

Consider now the second example where station set 104 terminates the multi-level conference call. The user of station set 104 actuates the termination of the multi-level conference by positioning the cursor on the screen of station set 104 as illustrated in FIG. 13 next to the entry for station set 101 and actuating the disconnect button. Terminal manager 405 of station set 104 is responsive to that action to transmit the disconnect message illustrated in line 1206 of FIG. 12. Terminal manager 405 informs conference manager 404 of the termination of station set 101. In response, conference manager 404 removes all references to station sets 101 and 102. In response to the disconnect message, switch 107 terminates the connection between station set 104 and station switch 107. Further, switch 107 transmits a disconnect message to station set 101 and removes the connection between station set 101 and switch 107. In response to the disconnect message from switch 107, station set 104 updates the party records of station sets 105 and 106 by transmitting the notify messages illustrated in lines 1207 and 1208. Terminal manager 407 of station set 105 is responsive to the notify message of line 1207 to eliminate entries 505 and 506 which reference station sets 101 and 102. In eliminating those entries, terminal manager 407 uses the fact that station set 101 has been disconnected to also eliminate entry 506 since station set 102 is a sub-party on a conference call controlled by station set 101. Terminal manager 408 of station set 106 performs similar operations in response to the notify message of line 1208.

Terminal manager 305 of station set 101 is responsive to the receipt of the disconnect message from switch 107 to transmit the notify message of line 1209 of FIG. 12 to station set 102 and to inform conference manager 304 of the fact that station set 104 has terminated the call. Terminal manager 307 of station set 102 is responsive to the notify message of 1209 to remove entries 510, 511, and 512 of party record 306. Conference manager 304 is responsive to the termination of station set 104 to remove entries relating to station sets 104, 105, and 106 from conference record 301.

Figure 14:
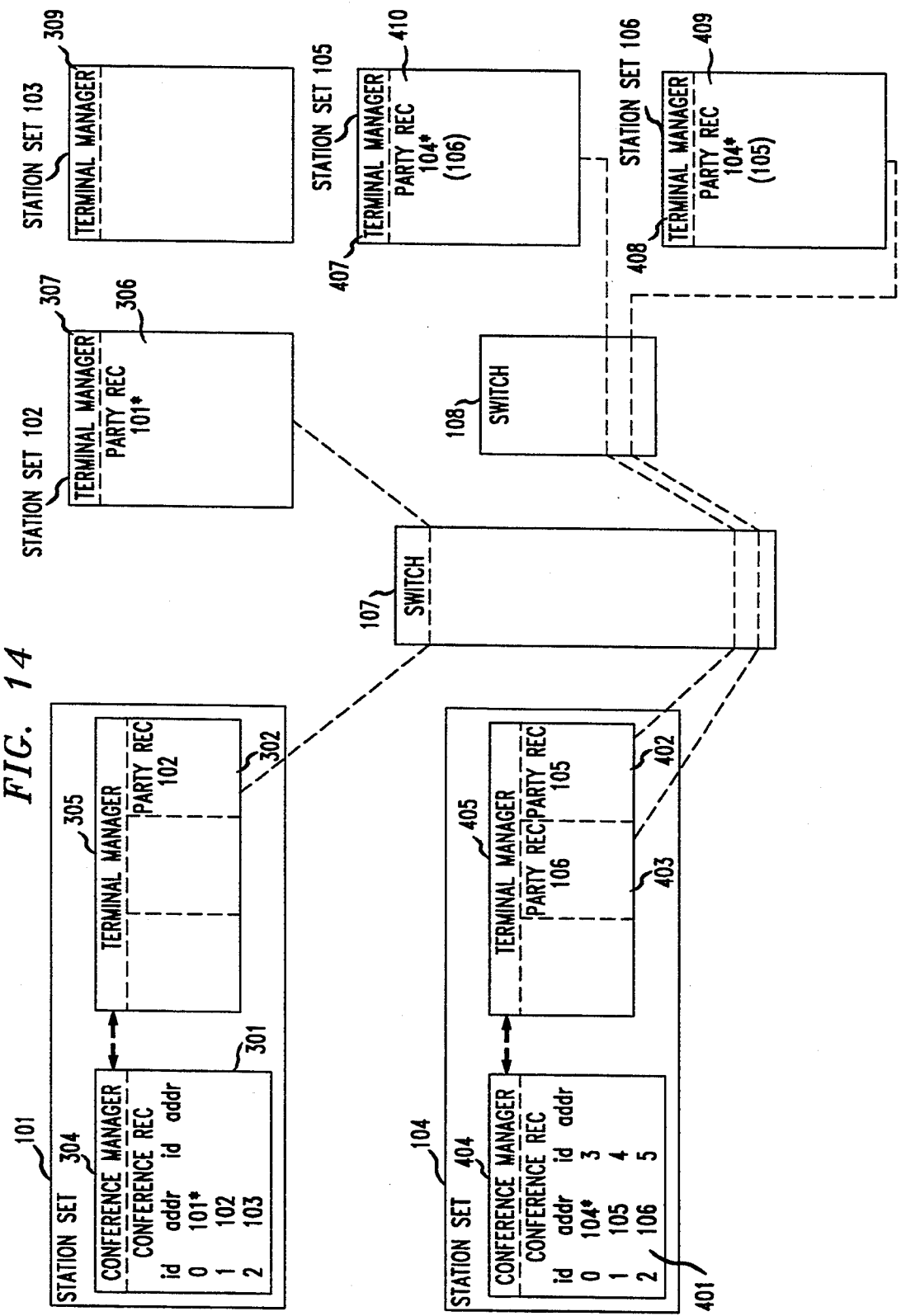
FIG. 14 illustrates the records of the station sets after transmission of the messages of FIG. 12.

After the two previous examples have been implemented by the transmission of messages illustrated in FIG. 11, the records of station sets 101, 102, 104, 105, and 106 are illustrated in FIG. 14.

Figure 15:
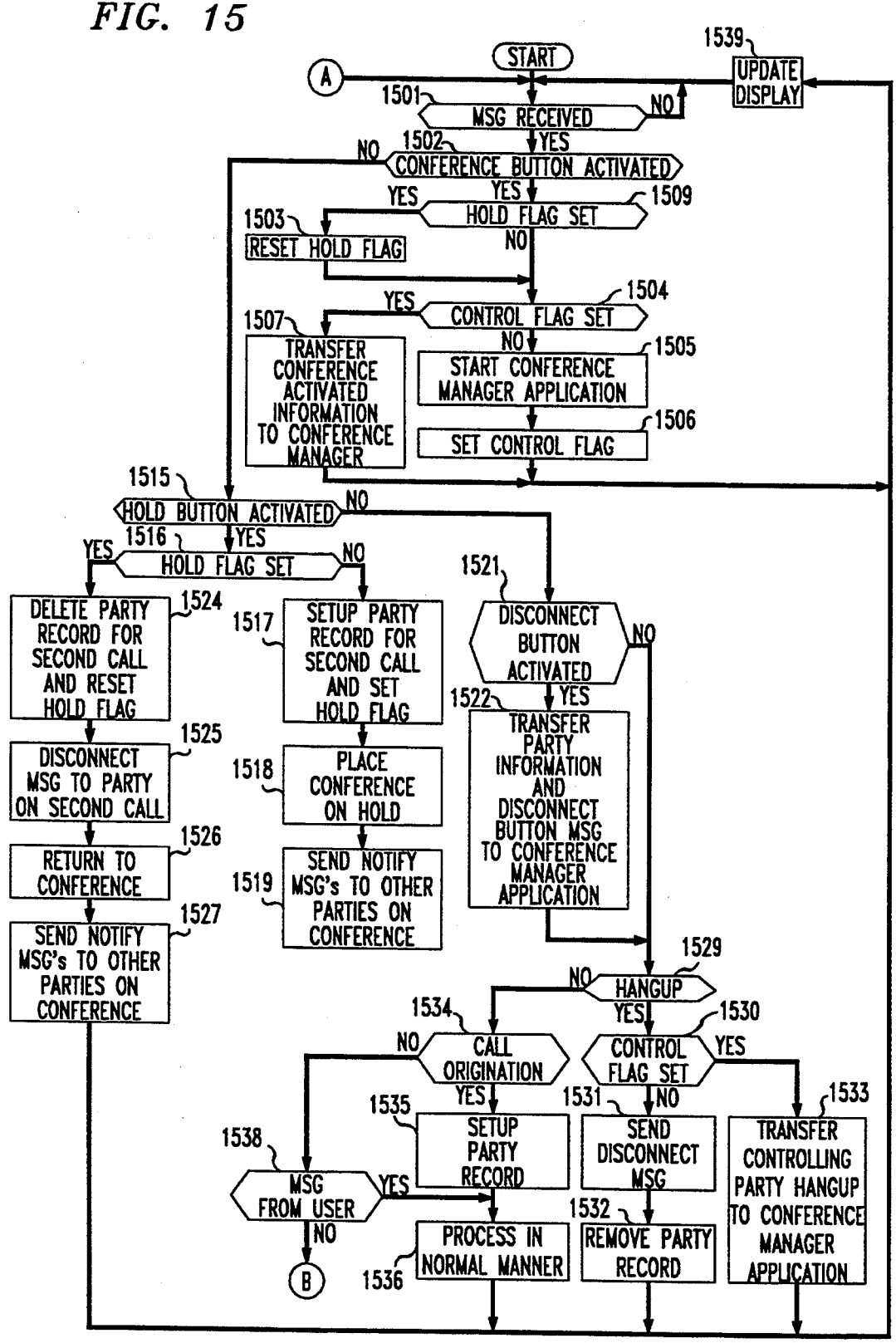
FIGS. 15 and 16 illustrate, in block diagram form, the operations performed by a terminal management application.
Figure 16:
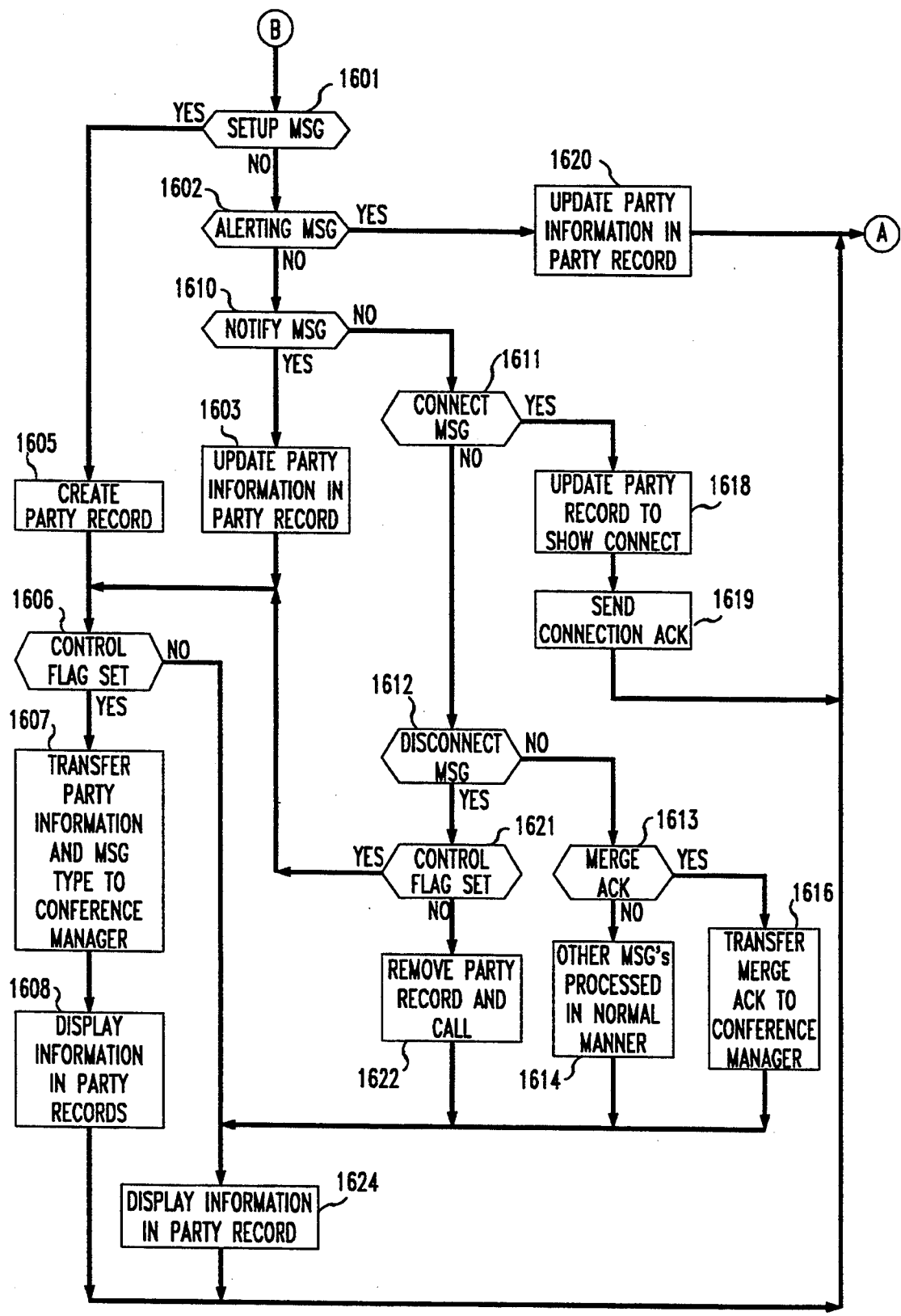

In flow chart form, FIG. 15 illustrates the operations performed by a terminal manager in response to stimuli received as a result of user actions performed on the terminal. FIG. 16 illustrates the operations performed by a terminal manager application in response to ISDN messages being received from other terminals or switches. FIGS. 15 and 16 illustrate the operations to be performed either by a terminal manager of a terminal that is the controlling terminal of a conference or simply a terminal that is a party to a conference. Two flags are utilized by the terminal management application: control flag indicating whether the terminal is controlling a conference and hold flag indicating whether a call had been placed on hold. Decision block 1501 of FIG. 15 determines whether or not a message has been received, either as a result of a user action on the terminal or from an external source. Blocks 1502 through 1509 illustrate the operations performed when the user of the terminal actuates the conference button. Blocks 1515 through 1519 and 1524 through 1527 illustrate the operations performed when the user of a terminal actuates the hold button. Blocks 1521 and 1522 illustrate the operations performed when the user of the terminal selects a party to be disconnected by positioning the curser next to that party name on the station set display and actuating the disconnect button. Blocks 1529 through 1533 illustrate the operations to be performed when the user of the terminal hangs up by going on hook. Blocks 1534 through 1536 illustrate the operations performed when the caller performs the initial call origination. Block 1538 determines whether the user of the terminal has performed any other operations.

To illustrate the operations of a terminal manager and a conference manager application, consider an example which assumes an initial state as illustrated in FIG. 4 and progresses through the previous examples to the state illustrated in FIG. 14. In FIG. 4, station set 101 is controlling a conference comprising station set 102 and station set 103; whereas, station set 104 is controlling a conference comprising station sets 105 and 106. Consider now the operations performed by the terminal and conference managers to progress to the state of a multi-conference call as illustrated in FIG. 5. First, the user of station set 101 actuates the hold button. Decision block 1501 of FIG. 15 detects this actuation and transfers control to decision block 1515 (via decision block 1502) which determines that the hold button has been actuated. In response, control is transferred to decision block 1516 which checks if the hold flag is set. In the present situation, it is not set and control is transferred to decision block 1517 which sets up party record 501 for a second call and sets the hold flag. Block 1518 then places the present conference on hold which is the conference comprising station sets 101, 102, and 103. Block 1519 transmits notify messages to station sets 102 and 103. In response to the user dialing the telephone number of station set 104, terminal manager 305 transmits the setup message of line 601 of FIG. 6 to station set 104. When station set 104 responds with the call proceeding message of line 602 of FIG. 6, the operations performed by FIGS. 15 and 16 is the execution of block 1614 since the call proceeding message match none of the messages tested for in FIGS. 15 and 16. (Note, that if the messages tested for in FIG. 15 are not found, control is transferred to decision block 1601 of FIG. 16.) When station set 104 transmits back the alerting message of line 603, this is detected by decision block 1602 of FIG. 16, and block 1620 is executed which adds station set 104's information to party record 501 and conference record 301 of FIG. 5 by execution of block 1620. When station set 104 transmits back the connect message of line 604 of FIG. 6, this message is detected by decision block 1611 and control is transferred to block 1619. The latter block transmits back to station set 104 the connection acknowledge message of line 605. Finally, block 1618 updates party record 501 of FIG. 5 to show that station set 104 is connected.

Figure 17:
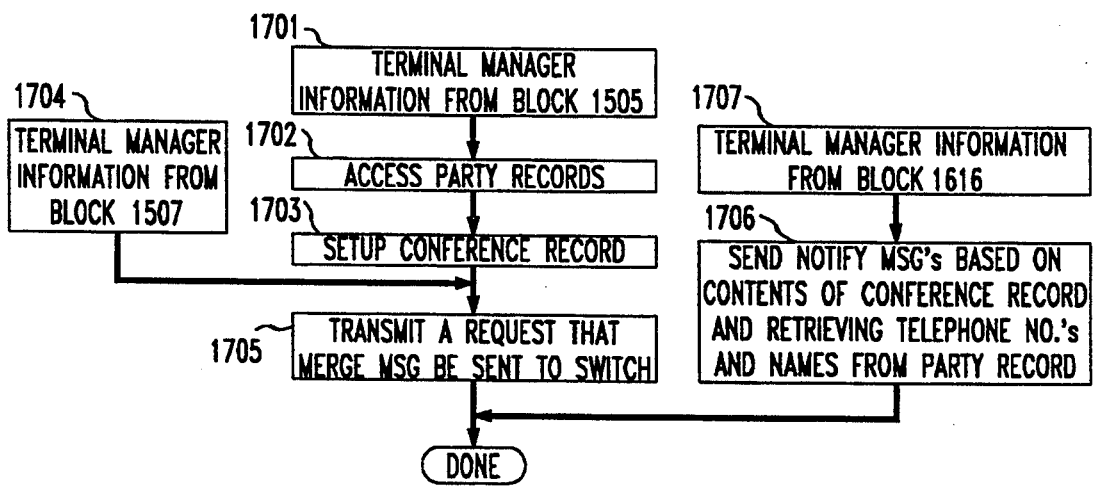
FIGS. 17 through 20 illustrate, in flow chart form, the operations performed by a conference manager application.

In response to station set 104 being shown on the display of station set 101 as being connected, the user of station set 101 can talk with the user of station set 104. When the user of station set 101 wants to join station set 104 into the conference, the user of station set 101 activates the conference button. This activation of the conference button is detected by decision block 1502 of FIG. 15 and control is transferred to decision block 1509. Since the hold flag had been previously set, control is transferred to block 1503. The latter block resets the hold flag and transfers control to decision block 1504. Since station set 101 is controlling a conference, the control flag is set; and decision block 1504 transfers control to block 1507. Block 1507 then transfers the information concerning the fact that the conference button has been actuated to the conference manager which performs the operations illustrated in FIG. 17. This causes the execution of block 1705 which transmits the merge message to switch 107 as illustrated in line 606 of FIG. 6.

When the merge acknowledgment is received back from switch 107 by station set 101 as illustrated in line 608 of FIG. 6, this is detected by decision block 1613 which causes block 1616 to be executed. Block 1616 transfers control to the conference manager and causes the execution of block 1706 of FIG. 17. Block 1706 transmits the notify messages of lines 609 through 612.

At the present time only station set 104 is part of the conference call between station sets 101, 102, and 104. To add station sets 105 and 106 and create a multi-level conference, the user of station set 104 actuates the conference button which as was previously described results in blocks 1509, 1504, and 1507 being executed and station sets 105 and 106 to be merged into the conference. The execution of block 1507 causes the conference manager to execute block 1705 which transmits a merge request to switch 108. When switch 108 responds with a merge acknowledgment, the terminal manager of station set 104 detects this by the execution of decision block 1613 and transfers control to block 1617. The execution of block 1616 causes the conference manger of station set 104 to execute block 1706 of FIG. 17. The execution of block 1706 results in the transmission of the notify messages of lines 703 through 710 of FIG. 7 from station set 104.

Figure 18:
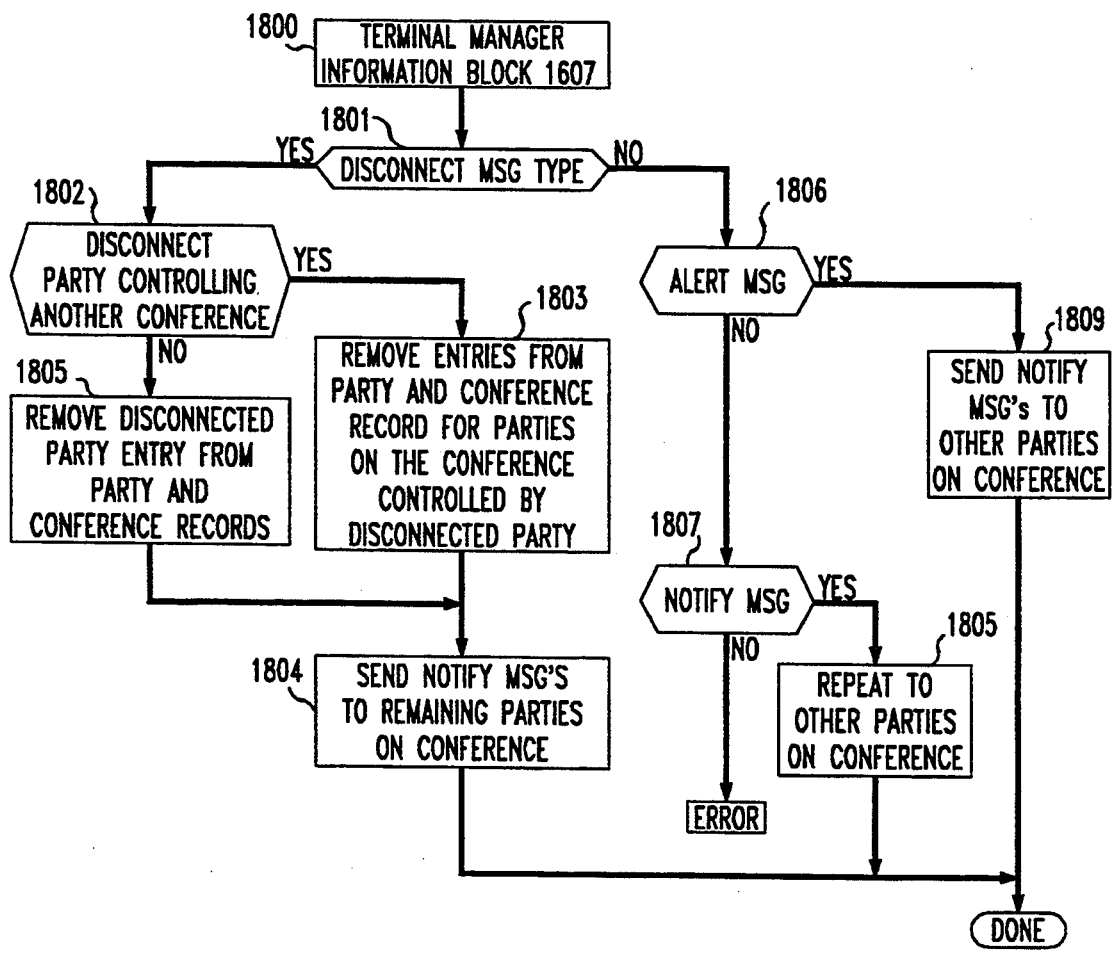

When the notify messages are received by terminal manager 305 of station set 101, they are detected by decision block 1610 which adds this information to party record 501 of FIG. 5 and transfers control to decision block 1606. Since the control flag is set in station set 101, control is passed to block 1607. The execution of block 1607 causes conference manager 304 of station set 101 to perform the operations illustrated in FIG. 18. The message type is identified by decision block 1807 as notify messages and these messages are repeated to station sets 102 and 103 as illustrated in the messages of lines 711 through 714 of FIG. 7. As station sets 102 and 103 receive these messages they update their party records as indicated by block 1603 of FIG. 16 which defines the response of a terminal manager to a notify message. However, since the control flag has not been set in station sets 102 and 103, decision block 1606 transfers control to block 1624 of FIG. 16.

Figure 19:
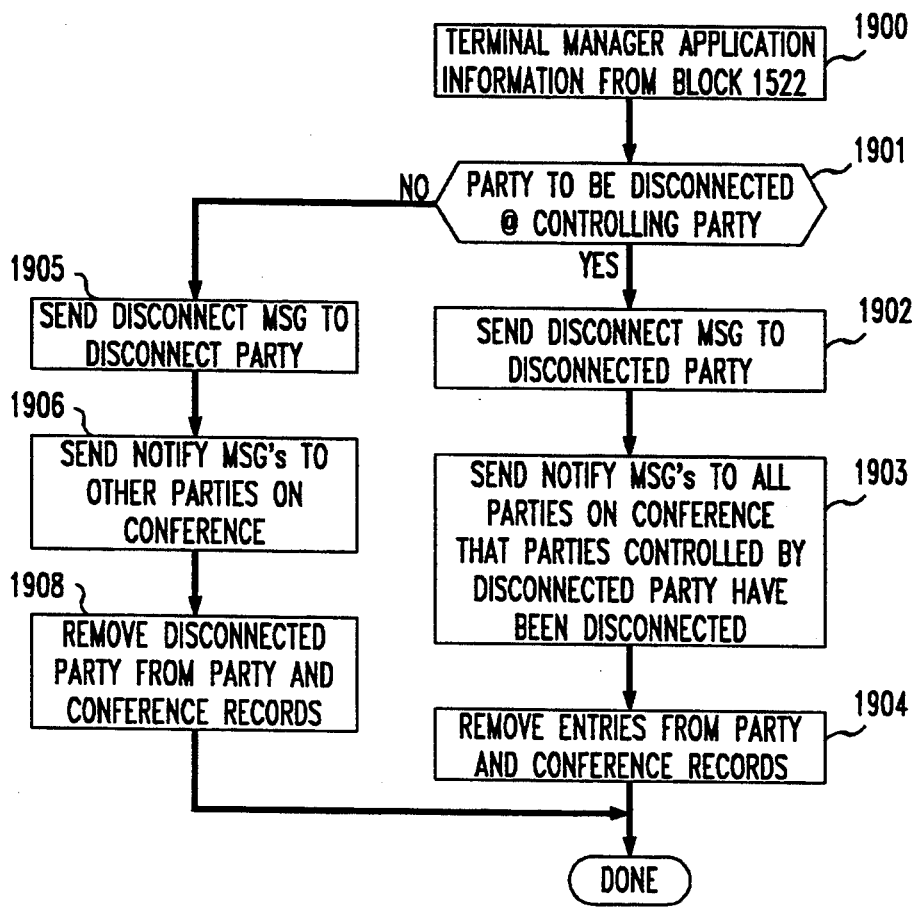
Figure 20:
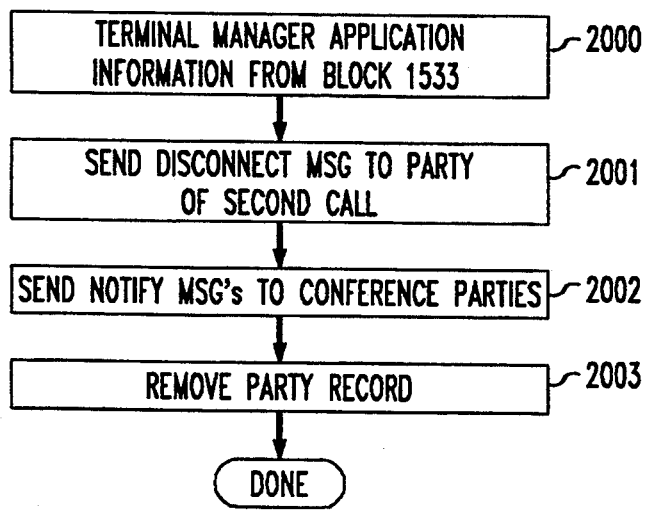

Consider now, how the state of the system of FIG. 1 is transferred from that illustrated in FIG. 5 to that illustrated in FIG. 14. First, the user of station set 101 positions the cursor by the name of the user of station set 103 and actuates the disconnect button. This actuation is detected by decision block 1521 of FIG. 15. Decision block 1521 transfers control to block 1522 which causes the conference manager of station set 101 to execute the operations illustrated in FIG. 19. Decision block 1901 of FIG. 19 determines that the party being disconnected is not a controlling party by examination of conference record 301. Based on this determination, decision block 1901 transfers control to block 1905 which causes the transmission of the disconnect message to station set 103 as shown in line 1201 of FIG. 12. Next, block 1906 is executed which results in the transmission of the notify messages illustrated in lines 1202 and 1203 of FIG. 12. Finally, block 1908 removes reference to station set 103 from party record 303 and, conference record 304. Note, that station set 104 is responsive to the notify message of 1203 to transmit the notify messages of lines 1204 and 1205. This results because when the notify message of line 1203 is received by terminal manager 405 of station set 104, it is detected by decision block 1610 of FIG. 16 which causes the execution of blocks 1603, 1606, and 1607. As previously described, execution of block 1607 results in the execution of the operations of FIG. 18 by conference manager 405 of station set 104. During the execution of the operations of FIG. 18, blocks 1807 and 1808 are executed resulting in the transmission of the notify messages of lines 1204 and 1205 of FIG. 12.

Next, the user of station set 104 positions the cursor on the display of station set 104 by the name of the user of station set 101 and actuates the disconnect button. Terminal manager 405 of station set 104 detects the execution of the disconnect button by decision block 1521. The latter decision block transfers control to block 1522 which results in conference manager 404 of station set 104 performing the operations illustrated in FIG. 19. Decision block 1901 determines that station set 101 is a controlling party by examining party record 501 and control is transferred to block 1902. The latter block causes the transmission of the disconnect message illustrated in line 1206 of FIG. 12. Next, block 1903 is executed which causes the transmission of the notify messages of lines 1207 and 1208 of FIG. 12. Finally, block 1904 removes all entries for station set 101 and parties controlled by station set 101 from party record 502 and conference record 401 of FIG. 5. Finally, station set 101 is responsive to the notify message of line 1206 to transmit the notify message of line 1209 to station set 102. The final result is that the system of FIG. 1 is now at the state illustrated in FIG. 14.

It is to be understood that the above-described embodiments are merely illustrative of principles of the invention and that other arrangements may be devised by those skilled in the art without departing from the spirit or scope of the invention. In particular, one skilled in the art could ready determine that the above-described embodiments are capable of supporting more than two sub-conferences per multi-level conference and more than two levels in a multi-level conference.

We claim:

1. An apparatus for establishing and controlling a multi-level telecommunication conference between a plurality of telecommunication terminals interconnected by a telecommunication switching system, comprising:

means, in a first telecommunication terminal, for establishing a first telecommunication conference among a first subset of the telecommunication terminals including the first telecommunication terminal, via the telecommunication switching system and for controlling removal of any one of the telecommunication terminals from the first telecommunication conference;

means, in a second telecommunication terminal, for establishing a second telecommunication conference among a second subset of the telecommunication terminals including the second telecommunication terminal, via the telecommunication switching system, and for controlling removal of any one of the telecommunication terminals from the second telecommunication conference;

means, in the first telecommunication terminal, by communicating with the second telecommunication terminal, for forming a multi-level telecommunication conference to combine the second telecommunication conference and the first telecommunication conference via the telecommunication switching system;

means, in the first telecommunication terminal, for notifying each of the first subset of the telecommunication terminals of identities of users of the other ones of the first subset of the telecommunication terminals;

means, in the second telecommunication terminal, for notifying each of the second subset of the telecommunication terminals of identities of users of the other ones of the second subset of the telecommunication terminals;

the notifying means, in the second telecommunication terminal, further notifying the first telecommunication terminal of the identities of users of the second telecommunication conference; and the notifying means, in first telecommunication terminal, further notifying the other ones of the first subset of the telecommunication terminals of the identities of users of the second telecommunication conference.

2. The apparatus of claim 1 wherein the notifying means, in the first telecommunication terminal, further notifying the second telecommunication terminal of the identities of users of the first telecommunication conference; and the notifying means, in the second telecommunication terminal, further notifying the other ones of the second subset of the telecommunication terminals of the identities of users of the first telecommunication conference.

3. The apparatus of claim 2 wherein the notifying means, in the first telecommunication terminal, uses notify messages to directly transmit the identities of users to the other ones of the telecommunication terminals of the first telecommunication conference.

4. The apparatus of claim 3 wherein each one of the first subset of the telecommunication terminals in response to being added to the first telecommunication conference transmits the identity of the user of each of the first subset of the telecommunication terminals to the first telecommunication terminal; and the establishing means, in the first telecommunication terminal, stores the identities of the users of the first subset of the telecommunication terminals in an internal table of the first telecommunication terminal.

5. The apparatus of claim 4 wherein the notifying means, in the first telecommunication terminal, in response to the identities of the second subset of the telecommunication terminals received from the second telecommunication terminal, stores the identities of the users of the second telecommunication conference in the internal table; and the notifying means, in the first telecommunication terminal, uses the contents of the internal table to form the notify messages for transmission to the other ones of first subset of the telecommunication terminals.

6. The apparatus of claim 5 wherein each of the other ones of the first subset of the telecommunication terminals in response to the notify messages from the first telecommunication terminal stores the identities of users in an internal table in each of the other ones of the first subset of the telecommunication terminals.

7. The apparatus of claim 6 further comprises means, in each of the other ones of the first subset of the telecommunication terminals, for displaying the contents of the internal table of each.

8. A method for establishing and controlling a multilevel telecommunication conference between a plurality of telecommunication terminals interconnected by a telecommunication switching system, the method comprising the steps of:

establishing, by a first telecommunication terminal, a first telecommunication conference among a first subset of the telecommunication terminals including the first telecommunication terminal, via the telecommunication switching system, and controlling removal of any one of the telecommunication terminals of the first subset of the telecommunication terminals;

establishing, by a second telecommunication terminal, a second telecommunication conference among a second subset of the telecommunication terminals including the second telecommunication terminal, via the telecommunication switching system, and controlling removal of any one of the telecommunication terminals of the second subset of the telecommunication terminals;

forming, by the first telecommunication terminal, by communicating with the second telecommunication terminal, a multi-level telecommunication conference to combine the second telecommunication conference and the first telecommunication conference via the telecommunication switching system;

notifying, by the first telecommunication terminal, each of the first subset of the telecommunication terminals of identities of users of the other ones of the first subset of the telecommunication terminals;

notifying, by the second telecommunication terminal, each of the second subset of the telecommunication terminals of identities of users of the other ones of the second subset of the telecommunication terminals;

the notifying step, by the second telecommunication terminal, further notifies the first telecommunication terminal of the identities of users of the second telecommunication conference; and the notifying step, by the first telecommunication terminal, further notifies the other ones of the first subset of the telecommunication terminals of the identities of users of the second telecommunication conference.

9. The method of claim 8 wherein the notifying step, by the first telecommunication terminal, further notifies the second telecommunication terminal of the identities of users of the first telecommunication conference; and the notifying step, by the second telecommunication terminal, further notifies the other ones of the second subset of the telecommunication terminals of the identities of users of the first telecommunication conference.

10. The method of claim 9 wherein the notifying step, by the first telecommunication terminal, uses notify messages to directly transmit the identities of users to the other ones telecommunication terminals of the first telecommunication conference.

11. The method of claim 10 further comprises the step of transmitting by a telecommunication terminal added to the first subset of the telecommunication terminals of the first telecommunication conference the identity of the user of the added telecommunication terminal to the first telecommunication terminal; and the establishing step, by the first telecommunication terminal, stores the identities of the users of the first subset of the telecommunication terminals in an internal table of the first telecommunication terminal.

12. The method of claim 11 wherein the notifying step, by the first telecommunication terminal, in response to the identifies of the second subset of the telecommunication terminals received from the second telecommunication terminal stores the identities of the users of the second telecommunication conference in the internal table; and the notifying step, by the first telecommunication terminal, uses the contents of the internal table to form the notify messages for transmission to the other ones of first subset of the telecommunication terminals.

13. The method of claim 12 further comprises the step wherein each of the other ones of the first subset of the telecommunication terminals, in response to the notify messages from the first telecommunication terminal, stores the identities of users in an internal table in each of the other ones of the first subset of the telecommunication terminals.

14. The method of claim 13 further comprises the step of displaying, by each of the other ones of the first subset of the telecommunication terminals, the contents of the internal table of each.

* * * * *